Patented Sept. 26, 1922.

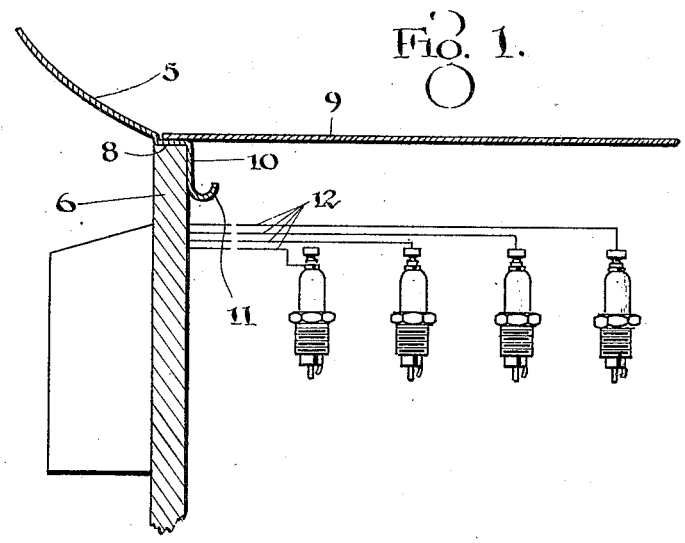
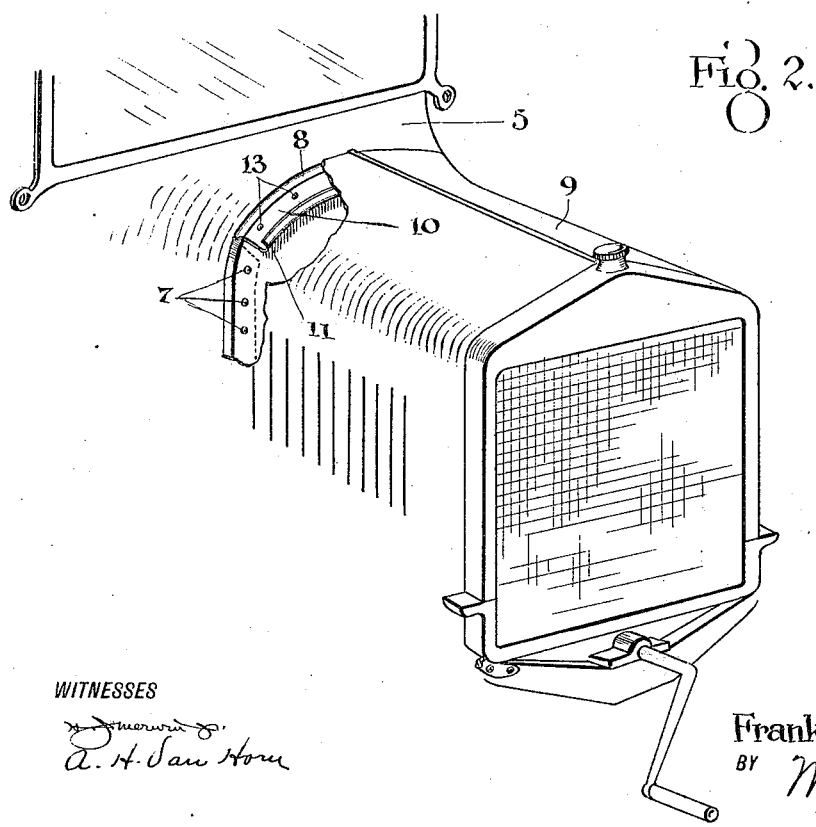

1,430,241

UNITED STATES PATENT OFFICE.

FRANK POWELL LIDE, OF DECATUR, ALABAMA.

COIL-BOX PROTECTOR.

Application filed October 6, 1920. Serial No. 414,951.

*To all whom it may concern:*

Be it known that I, FRANK P. LIDE, a citizen of the United States, and a resident of Decatur, in the county of Morgan and State of Alabama, have invented certain new and useful Improvements in Coil-Box Protectors, of which the following is a specification.

My invention is an improvement in coil box protectors for automobiles and the like vehicles.

An important object of my invention is to produce a device of this character which will effectively protect the wires within the hood from water or the like.

A further object is to produce a protector of this type which will be inexpensive to manufacture and simple in construction.

In the accompanying drawings forming a part of this specification and in which like numerals are employed to designate like characters throughout the same, Figure 1 is a sectional view of my device showing how it is applied to the dash, and Figure 2 is a perspective view showing the device applied.

A coil 5 formed of one piece of metal has portions bent in around the sides of the dash board 6 as shown in Figure 2 by dotted lines and is secured thereto by bolts or rivets 7. Another portion of the cowl 5 is bent outwardly as shown in Figure 1 and designated at 8, and rests upon the top of the dash, forming a seat for the hood 9.

This outer portion of the cowl 5 is bent over the edge of the dash 6 and extends downwardly a short distance as at 10 where its lower edge is bent up to form a trough 11. This trough extends the entire length of the outer portion of the cowl and lies beneath the hood 9 and above the wires 12.

The outer portion is secured to the dash by bolts 13. The purpose of having the end portions and center portion secured to the inner and outer faces of the dash respectively, is to provide a rigid supporting means for the dash. This particular arrangement will tend to counter-act any lateral stresses exerted upon the dash, and will hold the dash rigid.

In use, the device being formed in one piece affords a continuous passage from the cowl to the trough for water or the like that usually enters the opening formed where the hood rests on the dash. This is a very important feature of my device as water falling on to the cowl above will run off over the dash and into the trough 11 where it will be drained off at the sides within the hood, thus protecting the wires as described. It should be noted that the trough is formed integral with the cowl and in this manner assures the drainage of water from the cowl, to the trough.

It is to be understood that various changes in the size and shape may be made without departing from the spirit of the invention or the scope of the appended claims.

I claim:

1. In a motor vehicle, in combination with the dash thereof, a cowl having its forward edge extended, said extended edge being slit transversely to provide an intermediate portion and two end portions, the intermediate portion being bent to form a trough whereby to discharge the water running forwardly upon said cowl to either side of the engine associated with said motor vehicle and the end portions being bent downwardly whereby the same may be secured to the dashboard for rigidly holding the cowl in position.

2. In a motor vehicle, in combination with a dash board therefor, a cowl having its forward edge associated with the dash extended and said extended portion being slit transversely to provide an intermediate portion adapted to be disposed on the forward side of the cowl, said intermediate portion being formed to provide a trough adapted to discharge the water running forwardly upon said cowl to either side of the engine associated with said motor vehicle, and the remaining portions of the cowl extension being bent substantially at right angles to the cowl and adapted to be fitted to the inner side of the dash and be secured thereto and thereby to secure the cowl to the dashboard.

FRANK POWELL LIDE.